US011011045B1

United States Patent
Baker et al.

(10) Patent No.: US 11,011,045 B1
(45) Date of Patent: May 18, 2021

(54) OBJECT DETECTION AND ALERT FOR AUTONOMOUS RIDE-SHARING VEHICLE

(71) Applicant: Honda Motor Co., Ltd., Tokyo (JP)

(72) Inventors: Alex W. Baker, Ostrander, OH (US); Jacob J. Olchovy, Marysville, OH (US); Michael A. Baumbarger, Marysville, OH (US); Zainab I. Ali, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/672,012

(22) Filed: Nov. 1, 2019

(51) Int. Cl.
*G08B 21/24* (2006.01)
*G08B 25/10* (2006.01)
*B60Q 9/00* (2006.01)
B60Q 3/54 (2017.01)
B60R 16/03 (2006.01)
B60N 2/70 (2006.01)
B60R 13/02 (2006.01)
G05D 1/02 (2020.01)

(52) U.S. Cl.
CPC ............... *G08B 21/24* (2013.01); *B60Q 9/00* (2013.01); *G08B 25/10* (2013.01); B60N 2/70 (2013.01); B60Q 3/54 (2017.02); B60R 13/0268 (2013.01); B60R 16/03 (2013.01); G05D 1/021 (2013.01)

(58) Field of Classification Search
CPC ....................................................... G08B 21/24
See application file for complete search history.

(56) References Cited

U.S. PATENT DOCUMENTS

| 4,806,204 A | 2/1989 | Manfré et al. |
| 5,624,132 A | 4/1997 | Blackburn et al. |
| 5,678,854 A | 10/1997 | Meister et al. |

(Continued)

FOREIGN PATENT DOCUMENTS

| CN | 201515714 | 6/2010 |
| CN | 101817291 A | 9/2010 |

(Continued)

OTHER PUBLICATIONS

T. Dias, and R. Monaragal. "Development and analysis of novel electroluminescent yarns and fabrics for localized automotive interior illumination", SAGE Journals, vol. 82 issue: 11, pp. 1164-1176, Jan. 19, 2012. https://journals.sagepub.com/doi/abs/10.1177/0040517511420763?journalCode=trjc.

(Continued)

*Primary Examiner* — Travis R Hunnings
(74) *Attorney, Agent, or Firm* — Rankin, Hill & Clark LLP

(57) ABSTRACT

A system for providing an alert to an owner of an object that the object is on a surface. The alert reminds the owner that the object is on the surface and to retrieve the object, thus inhibiting abandonment of the object by the owner. The system includes a material layer including a conductive thread thereon. The material layer can define the surface and be arranged in a vehicle. An electrical current flowing through the conductive thread produces an electrical phenomenon. The object produces a change in the electrical phenomenon detected by the sensor. If the object is detected on the surface and the owner of the object is leaving the object on the surface, the system provides the alert to the owner that the object is on the surface so the object can be retrieved by the owner.

20 Claims, 1 Drawing Sheet

(56) References Cited

U.S. PATENT DOCUMENTS

| | | | |
|---|---|---|---|
| 5,971,432 A | 10/1999 | Gagnon et al. | |
| 5,996,807 A | 12/1999 | Rumpf et al. | |
| 6,478,858 B2 | 11/2002 | Angermann et al. | |
| 6,543,299 B2 | 4/2003 | Taylor | |
| 6,613,227 B2 | 9/2003 | Rickle | |
| 6,697,723 B2 | 2/2004 | Olsen et al. | |
| 6,964,370 B1 | 11/2005 | Hagale et al. | |
| 7,880,613 B1* | 2/2011 | Maeng | G06K 7/10079 340/572.1 |
| 8,060,282 B2 | 11/2011 | Breed | |
| 8,729,505 B2 | 5/2014 | Seibt | |
| 9,631,589 B2 | 4/2017 | Harp | |
| 9,772,422 B2 | 9/2017 | Hull et al. | |
| 10,000,097 B2 | 6/2018 | Kim et al. | |
| 10,274,647 B2 | 4/2019 | Seder et al. | |
| 2003/0122669 A1* | 7/2003 | Filippov | B60R 21/01532 340/563 |
| 2010/0160882 A1 | 6/2010 | Lowe | |
| 2011/0221459 A1* | 9/2011 | Uno | B60R 21/01532 324/713 |
| 2011/0240751 A1 | 10/2011 | Rauh et al. | |
| 2014/0134387 A1 | 5/2014 | Yamada et al. | |
| 2014/0210603 A1 | 7/2014 | Walser | |
| 2015/0329041 A1* | 11/2015 | Salter | B60Q 3/80 362/510 |
| 2016/0010273 A1 | 1/2016 | Ashayer-Soltani et al. | |
| 2016/0278444 A1 | 9/2016 | Jordan et al. | |
| 2016/0379466 A1* | 12/2016 | Payant | G08B 21/22 340/457 |
| 2018/0005766 A1* | 1/2018 | Fairbanks | H01G 9/2095 |
| 2018/0225988 A1 | 8/2018 | Morgado | |
| 2018/0307315 A1 | 10/2018 | Gong et al. | |
| 2018/0333756 A1 | 11/2018 | Seder et al. | |

FOREIGN PATENT DOCUMENTS

| | | |
|---|---|---|
| CN | 201624172 | 11/2010 |
| CN | 104389076 B | 3/2015 |
| CN | 205417544 U | 8/2016 |
| CN | 205462733 U | 8/2016 |
| CN | 106149134 A | 11/2016 |
| CN | 108032711 | 5/2018 |
| CN | 207523509 U | 6/2018 |
| CN | 207568736 U | 7/2018 |
| CN | 207583526 U | 7/2018 |
| CN | 208730904 U | 4/2019 |
| DE | 102008064006 | 10/2009 |
| DE | 102010023892 | 8/2011 |
| DE | 102014005403 A1 | 10/2014 |
| EP | 2163459 | 3/2010 |
| EP | 3287304 | 2/2018 |
| EP | 3475724 | 5/2019 |
| JP | 2013154667 | 8/2013 |
| KR | 20030026458 A | 4/2003 |
| KR | 101590557 B1 | 2/2015 |
| KR | 101557245 | 10/2015 |
| KR | 20170111499 A | 10/2017 |
| KR | 20180019459 | 2/2018 |
| WO | WO2007004000 A1 | 1/2007 |
| WO | WO2018031476 | 2/2018 |

OTHER PUBLICATIONS

D. Bial, D. Kern, F. Alt, and A. Schmidt. "Enhancing outdoor navigation systems through vibrotactile feedback", CHI '11 Extended Abstracts on Human Factors in Computing Systems, Vancouver, BC, Canada, May 7-12, 2011 pp. 1273-1278. https://dl.acm.org/citation.cfm?doid=1979742.1979760.

F. Kiss, R. Boldt, B. Pfleging, and S. Schneegass. "Navigation Systems for Motorcyclists: Exploring WearableTactile Feedback for Route Guidance in the Real World", CHI 2018, Apr. 21-26, 2018, Montréal, QC, Canada. http://www.medien.ifi.lmu.de/pubdb/publications/pub/kiss2018motorcyclenavi/kiss2018motorcyclenavi.pdf.

F.A. Olsen. "Killing bacteria with electromagnetic fields". DTU Chemical Engineering. Jun. 23, 2017. https://www.kt.dtu.dk/english/about-us/news/2017/06/killing-bacteria-with-electromagnetic-fields1?id=a6007cba-7469-4a20-a339-f17c96a82424, Printed Feb. 11, 2020.

\* cited by examiner

OBJECT DETECTION AND ALERT FOR AUTONOMOUS RIDE-SHARING VEHICLE

BACKGROUND

Users of ride-sharing vehicles often take along with them various objects of personal property, e.g. bags, phones, etc., which may be unwittingly left behind in the vehicle after the user and the vehicle part from one another. Once the user and the vehicle part ways, these objects that were left in the vehicle can be difficult or impossible to retrieve.

BRIEF DESCRIPTION

According to one aspect, a system for detecting and providing an alert that an object is on a surface includes a conductive thread; a power source electrically connected to the conductive thread and providing electric current flowing through the conductive thread; a sensor detecting electrical phenomena resulting from the electric current flowing through the conductive thread; and an indicator in communication with the sensor. The conductive thread is arranged relative to the surface such that when the object is on the surface, the object produces a change in the electrical phenomena. The indicator generates an alert that the change in the electrical phenomena is occurring, thus indicating that the object is on the surface.

According to another aspect, an autonomous ride-sharing vehicle includes a surface upon which an object can be arranged; a conductive thread; a power source electrically connected to the conductive thread and providing electric current flowing through the conductive thread; a sensor detecting electrical phenomena resulting from the electric current flowing through the conductive thread; and an indicator in communication with the sensor. The conductive thread is arranged relative to the surface such that when the object is on the surface, the object produces a change in the electrical phenomena. The indicator generates an alert if both of a) and b) are satisfied: a) the change in the electrical phenomena is occurring, and b) an occupant, who is the owner of the object, is leaving the vehicle.

DETAILED DESCRIPTION

Figure 1:
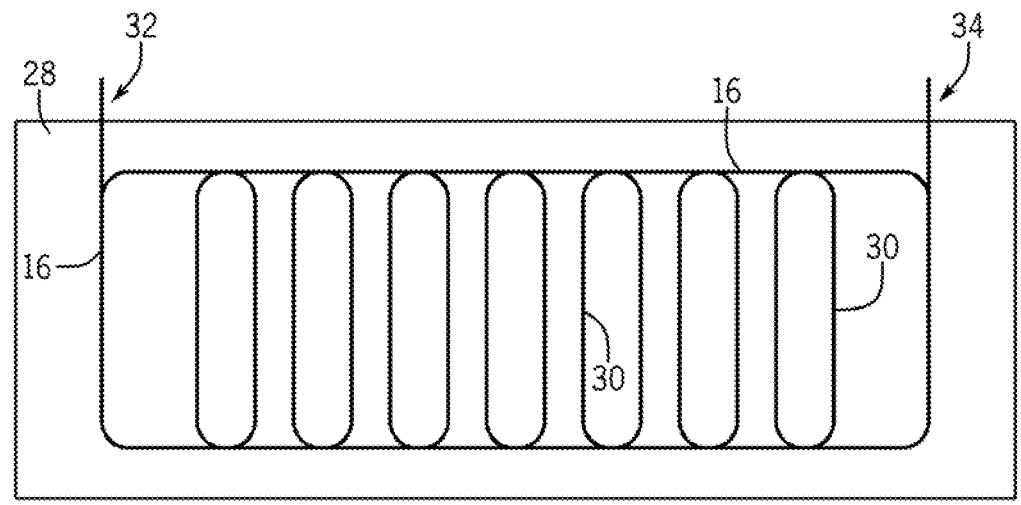
FIG. 1 is a plan view of a material layer including a conductive thread according to the present subject matter.

Ride-sharing vehicles are those which are typically owned by one person, yet used by other persons. These ride-sharing vehicles may include taxis, trains, buses, and autonomous ride-sharing vehicles, for example. Various objects of personal property of the users (referred to herein as "occupant" of the vehicle or "owner" or the object) may be brought along during transport in the vehicle, yet the object may be inadvertently left behind in the vehicle by the occupant when the occupant leaves the vehicle. This object may be of great importance to the occupant, and forgetting it in the vehicle may cause inconvenience and annoyance in efforts to retrieve the object from the vehicle.

The present subject matter provides a detection and alert system that detects an object on a surface, and provides an alert to an owner that the object is on the surface. The alert inhibits the object from being abandoned by the owner on the surface. The system includes a conductive thread incorporated into a surface where objects can be placed and possibly forgotten, e.g. in a vehicle. The conductive thread provides functionality to the surface to allow the object to be detected, and the system optionally provides an alert that the object is on the surface, so that the owner of the object is reminded that the object is on the surface and does not inadvertently abandon the object on the surface and instead retrieves the object from the surface.

With reference to the drawings, the present subject matter provides a system 2 for detecting an object 4 on a surface 6, and providing an indication (i.e. alert) 38 that the object 4 has been abandoned on the surface 6. Such alert 38 may remind the owner that the object 4 is on the surface 6, and thus prevent the owner from leaving the object 4 behind on the surface 6.

The system 2 may be employed in a vehicle 8 (e.g. a ride-sharing vehicle, boats, planes, etc.), or at other locations such as in building (e.g. houses, offices, restaurants, movie theaters, etc.), outdoor areas (e.g. park benches) or elsewhere. The system 2 may inhibit the owner of the object 4 from leaving the object 4 at these locations.

The surface 6 on which the object 4 is placed by the owner is not particularly limited, and may include any surface 6 where an object 4 can be placed, including a seat 10, a trunk 12, a floor 14, other surfaces, and combinations thereof of a ride-sharing vehicle. The object 4 may include any item, including items brought into the vehicle 8 by a occupant of the vehicle 8.

The system 2 may include a conductive thread 16, a power source 18, a sensor 20, an indicator 22, and an electronic control unit (ECU) 24.

The conductive thread 16 may be incorporated into a material layer 28 for including in the vehicle 8 or for including at other locations. The material layer 28 may be a flexible sheet-like structure capable of covering various components in the vehicle 8 or elsewhere.

The conductive thread 16 is an elongated conductive material arranged on the material layer 28. The conductive thread 16 is not particularly limited, and may include any one or more known conductive threads, including but not limited to a printed and cured conductive ink, a conductive polymer impregnated in or coated on a thread, a thin flexible conductive metal wire or braided cable, etc., or combinations thereof.

The conductive thread 16 may be arranged in or on the material layer 28, for example by printing, adhesive application, or other techniques, and/or may be arranged within or inside the material layer 28 (e.g. under an outer surface), for example by weaving, sewing, knitting, injection, mechanical mixing or other techniques.

The material layer 28 may include one or more conductive threads 16, and the conductive thread 16 may be arranged in a regular pattern or randomly on the material layer 28. The conductive thread 16 may be arranged in a grid-like pattern, or may be arranged in other regular patterns.

In a non-limiting embodiment as depicted in FIG. 1, the material layer 28 is a sheet-like structure including a single continuous conductive thread 16 arranged thereon in a regular pattern. As depicted, the conductive thread 16 is arranged in a regular pattern including one or more coils 30. Each coil 30 may include one or more turns of the conductive thread 16. By including the coils 30, electric current flowing through the coils 30 may produce a magnetic field by induction. In this embodiment, the conductive thread 16 may be flexible, so that after the material layer 28 is applied over a vehicle component, the conductive thread 16 maintains its electrical continuity from one end 32 to the other end 34 so that the electric current from the power source 18 can flow through the conductive thread 16 from the one end 32 to the other end 34.

The material layer 28 including the conductive thread 16 may be flexible, and thus may be arranged to cover various objects including vehicle components such as the seat 10, floor 14, trunk, 12, or roof 26 of the vehicle 8. The material layer 28 may include a woven or non-woven textile, synthetic or natural leather, polymers, etc., or combinations thereof.

The system 2 may include an electrical connection 36 provided between the power source 18 and the conductive thread 16 for transferring electric current from the power source 18 to the conductive thread 16. The power source 18 is thereby in electrical communication with the conductive thread 16 through the electrical connection 36, and thus electric current from the power source 18 can be supplied to, and thus flow through, the conductive thread 16 via this electrical connection 36.

The power source 18 provides electric current to the conductive thread 16. The power source 18 may be a battery or alternator of the vehicle 8, or may be a battery included in the vehicle 8 so as to provide electric current exclusively to the conductive thread 16.

The material layer may define the surface 6 upon which the object 4 is placed. In a non-limiting example, an occupant of the vehicle 8 may place the object 4 (e.g. a purse or computer, etc.) on the seat 10 or floor 14 adjacent the seat 10. That surface 6 of the floor 14 or seat 10 upon which the object 4 is placed, can be defined by the material layer including the conductive thread 16. The object 4 may be detected on the surface by the sensor 20.

The material layer may not define the surface 6, and instead may be arranged at a different location within the vehicle 8. In a non-limiting example, the material layer may be arranged on the roof 26 of the vehicle 8, and the object 4 may change the electrical phenomena generated by the conductive thread 16 on the roof 26, which is detected by the sensor 20.

Figure 2:
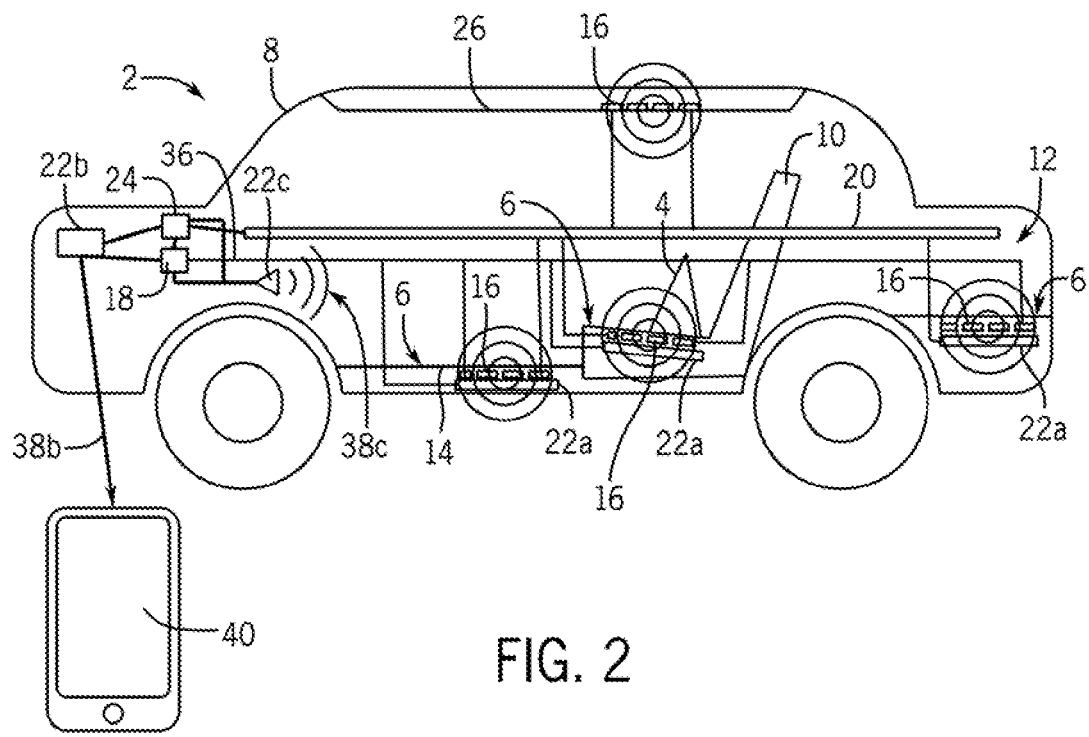
FIG. 2 is a schematic cross-sectional view of a vehicle including a detection and alert system according to the present subject matter.

More than one conductive thread 16 may be arranged in different locations within the vehicle 8 as depicted in FIG. 2. These multiple conductive threads 16 may have electrical current passing through them simultaneously, and thus the sensor may detect the change the electrical phenomena in each conductive thread as effected by the object 4.

The electrical current flowing through the conductive thread 16 produces electrical phenomena that can be detected by the sensor 20. The conductive thread 16 may be arranged relative to the surface 6 such that the electrical phenomena changes as a result of the object 4 being on the surface 6. The sensor 20 is included to monitor the electrical phenomena resulting from the electric current flowing through the conductive thread 16, and the change in the electrical phenomena resulting from the object 4 being on the surface 6. These electrical phenomena may be altered (e.g. in magnitude) by the presence of the object 4 on the surface 6 as explained in more detail herein.

The amount of electric current provided by the power source 18 may be constant, so that the change in the electrical phenomena is a result of the object 4 being in proximity to the conductive thread 16, and not a result in the change in the amount of the electrical current flowing through the conductive thread 16. Thus the detected change in the electrical phenomena may indicate that the object 4 is on the surface 6 and might be left behind in the vehicle 8 by the owner. The change in the electrical phenomena is not particularly limited, as long as it can be detected by the sensor 20, and may include for example, an increase or decrease in a magnitude of the electrical phenomena, a change in the type of electrical phenomena induced by the electric current flowing through the conductive thread 16, or other changes that can be detected by the sensor 20.

The electronic control unit (ECU) 24 of the vehicle 8 may be in communication with the sensor 20, the indicator 22, and the power source 18, and may operate to determine if the measured electrical phenomena has changed from a predetermined measurement value. The predetermined measurement value may be the measurement of the electrical phenomena when the surface 6 does not have an object 4 thereon. By placing the object 4 on the surface 6, the measured electrical phenomena may change from this predetermined measurement value. The ECU 24 may be configured to control the indicator 22 to generate the alert 38 only if the measured electrical phenomena changes by a predetermined amount or more from the predetermined measurement value. The predetermined amount may be determined based on how much the electrical phenomena would change if an object of a certain size, certain weight, certain material composition, or other characteristic were on the surface 6.

The sensor 20 may be external to the material layer 28 as shown in FIG. 2, or may be integral with the material layer 28, e.g. under the surface 6. Other arrangements of the sensor 20 with respect to the material layer 28 and conductive thread 16 can be used, including mounting one or more sensors 20 on the seat 10, on the floor 14, in the trunk 12 or on the roof 26, so long as the sensor 20 is able to detect the various electrical phenomena resulting from the electric current flowing through the conductive thread 16, and detect the change in the electrical phenomena resulting from the object 4 being arranged on the surface 6.

The sensor 20 may be configured to detect a) a voltage of the electric current flowing through the conductive thread 16, b) an electromagnetic field produced by the electric current flowing through the conductive thread 16, c) an inductance of the conductive thread 16 produced by the electric current flowing through the conductive thread 16, d) a capacitance of the conductive thread 16 produced by the electric current flowing through the conductive thread 16; or e) combinations of a)-d) along with other electrical phenomena resulting from the electric current flowing through the conductive thread 16. The sensor 20 may detect a)-e) wirelessly or through an electrical connection with the conductive thread 16, optionally via the electrical connection 36.

In a non-limiting embodiment, the sensor 20 detects the voltage of the electric current flowing through the conductive thread 16. The voltage may be affected by the object 4 being on the surface 6. The conductive thread 16 may be arranged under the surface 6 and include a piezoresistive material, which may experience an increase in resistance when mechanically stressed. The object 4 may mechanically stress the piezoresistive material simply by the weight of the object 4 pressing down by the force of gravity against the conductive thread 16 under the surface 6. Such mechanical stress may cause the piezoresistive material to experience an increase in resistance, which may reduce the voltage of the electric current flowing through the conductive thread 16. The sensor 20 may detect the original voltage (i.e. without the object 4 being on the surface 6) and the change in the voltage due to the object 4 being on the surface 6.

In another non-limiting embodiment, the sensor 20 detects an electromagnetic field produced by the electric current flowing through the conductive thread 16. For this purpose, the sensor 20 may include a detector coil and the conductive thread 16 may include coils 30 thereby forming a transmitter coil. Electric current flowing through the coils 30 of the conductive thread may induce an electromagnetic field, which may produce a corresponding electric current flowing through the detector coil of the sensor 20 by induction. The object 4 on the surface 6 may be in the electromagnetic field, and thus may affect the electromagnetic field by damping it or amplifying it. By measuring the amount of induced electric current flowing through the detector coil of the sensor 20, the sensor 20 is able to detect the object 4 on the surface 6.

In another non-limiting embodiment, the sensor 20 detects an inductance of the conductive thread 16 produced by the electric current flowing through the conductive thread 16. In this embodiment, the conductive thread 16 may include coils 30. When electric current is passed through the coils 30, this produces oscillation, which is a high frequency alternating electric current in the coils 30 that has a continuously changing electromagnetic field able to induce eddy currents in the object 4. The larger the object 4 is, the closer the object 4 is to the coils 30, and the greater its conductivity, the greater the induced eddy currents are in the object 4, and the more effect the object's 4 resulting opposing electromagnetic field has on the magnitude and frequency of the oscillation in the coils 30. The magnitude of the oscillations is reduced as the load is increased in a non-magnetic object 4, a leather purse, because the induced field in the object 4 opposes the source induction field from the coils 30, lowering net inductive impedance and therefore simultaneously tuning the oscillation frequency of the coils 30 to be higher. But that magnitude of the oscillation is less affected if the object 4 is highly magnetically permeable material, like iron, as that high permeability increases the coil inductance, lowering the frequency of oscillation. The sensor 20 may measure the change in magnitude of the oscillation with an amplitude modulation detector. The sensor 20 may detect a change in the frequency of the oscillation, which can be accomplished with a frequency discriminator circuits, like a phase lock loop detector, to see in what direction and how much the frequency shifts. As such, the type (conductive or non-conductive) and size of the object 4, and the proximity of the object 4 to the coils 30 can be determined.

In another non-limiting embodiment, the sensor 20 detects the capacitance of the conductive thread 16 produced by the electric current flowing through the conductive thread 16. The capacitance may be affected by the object 4 being on the surface 6. This may occur where the object 4 increases the parasitic capacitance of the conductive thread 16 to ground, thereby reducing its capacitance and thus indicating a the presence of the object 4 on the surface 6.

The ECU 24 may communicate with the sensor 20, the indicator 22, and the power source 18 to provide control instructions for operating the indicator 22. The ECU 24 may operate to determine the presence of the object 4 on the surface 6 based on the electrical phenomena resulting from the electric current flowing through the conductive thread 16 as measured by the sensor 20. The ECU 24 may compare these detected electrical phenomena against a predetermined value. If the difference exceed a predetermined amount, then the ECU 24 may control the indicator 22 to provide the alert 38 that the object 4 is on the surface 6 so as to remind the owner to take the object 4 off of the surface 6, i.e. take the object 4 with the owner.

This alert 38 may be provided when the owner of the object 4 might inadvertently abandon the object 4 on the surface 6, e.g. when the occupant is leaving the vehicle 8 or just before or after the occupant is leaving the vehicle 8. The system 2 may determine in various ways if the owner of the object 4 is leaving the vehicle 8 or could possibly leave the object 4 on the surface 6, including by the sensor 20, or other device, detecting the presence or absence of the owner in the vehicle 8 (which can be done in the same manner an detecting the object 4 as discussed herein), by the vehicle 8 being within a certain distance of a predetermined destination/location where the occupant is going to exit and leave the vehicle 8, etc. If the occupant has not yet left the vehicle 8, the alert 38 may be provided to the occupant as a reminder to take the object 4 with them. If the occupant has already left the vehicle 8, then the alert may be provided to the occupant as an instruction to return to the vehicle 8 to retrieve the object 4 from the surface 6.

The indicator 22 may include a light source 22a that emits light (not shown) as a visual alert 38 to an occupant of the vehicle 8. The light source 22a may include electroluminescent light source, such as electroluminescent yarn or other light emitting feature arrange under the surface 6 to thereby provide emitted light that is emits upward from under the object 4 to illuminate around the surface 6 where the object 4 is in contact with the surface 6, or may be arranged so as to shine light on the object 4 from above. The light may be flashing or constant. The indicator 22 may include a wireless transmitter 22b that emits a wireless signal 38b as a wireless alert 38 to a receiver 40 that is remote and external to the system 2 and/or to the vehicle 8. The receiver 40 may include one or more electronic devices of the occupant, e.g. a portable electronic device such as a mobile phone. The indicator 22 may include a speaker 22c that emits sounds 38c as an audible alert 38 so that the occupant can hear the sounds 38c and be reminded to take the object 4 with them from the surface 6. The indicator 22 may include these components, other components, or combinations thereof to provide one or more alerts 38 that the object 4 is on the surface 6. For example, the system 2 may provide an audible or visual alert 38 while the occupant is still in the vehicle 8 to remind the occupant to take the object with them; and then provide a wireless alert 38 if the occupant exits the vehicle 8 without taking the object 4 from the vehicle 8.

Rather than only including an alert 38 that the object 4 is on the surface 6, the alert 38 may also include additional information including the location of the object 4 within the vehicle 8, such as in the trunk 12 or in a front or back row of seats, and this additional information may be sent in the alert 38 continuously or periodically before, during, or after the occupant is leaving the vehicle 8.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for detecting and providing an alert to a user that an object of personal property of the user is on a surface, the system including:

a conductive thread;

a power source electrically connected to the conductive thread and providing electric current flowing through the conductive thread;
a sensor detecting electrical phenomena resulting from the electric current flowing through the conductive thread; and
an indicator in communication with the sensor;
wherein the conductive thread is arranged relative to the surface such that when the object is on the surface, the object produces a change in the electrical phenomena; and
wherein the indicator generates an alert indicating that the change in the electrical phenomena is occurring, thus indicating to the user that the object is on the surface.

2. The system according to claim 1, wherein:
the indicator includes a electroluminescent light source arranged under the surface;
the electroluminescent light source is selectively operable to emit light; and
the alert includes light emitted from the electroluminescent light source.

3. The system according to claim 2, wherein the electroluminescent light source includes electroluminescent yarn.

4. The system according to claim 1, wherein:
the indicator includes a transmitter;
the transmitter is selectively operable to send a wireless signal to a receiver associated with the user; and
the alert includes the wireless signal.

5. The system according to claim 1, wherein:
the surface is in a vehicle;
the user is an occupant of the vehicle;
the alert is generated only when the occupant is leaving the vehicle and the object is left on the surface;
the alert includes light emitted by electroluminescent yarn arrange under the surface, a wireless signal generated by a transmitter and sent to a receiver associated with the occupant, or combinations thereof.

6. The system according to claim 5, wherein:
the alert includes the emitted light and the wireless signal;
the light is emitted when the vehicle reaches a predetermined location where the occupant is to leave the vehicle;
the wireless signal is generated if the occupant leaves the vehicle without taking the object off of the surface; and
the receiver includes a portable electronic device of the occupant.

7. The system according to claim 5, wherein the conductive thread is arranged in a material layer covering a component of the vehicle.

8. The system according to claim 7, wherein the component includes a seat, a floor, a roof, a trunk, or combinations thereof.

9. The system according to claim 1, wherein:
the electrical phenomena includes a voltage of the electric current flowing through the conductive thread;
the conductive thread includes a piezoresistive material that experiences an increase in resistance when mechanically stressed by the object; and
the change in the electrical phenomena includes a decrease in the voltage resulting from the increase in resistance.

10. The system according to claim 1, wherein:
the electrical phenomena includes an electromagnetic field produced by the electric current flowing through the conductive thread, an inductance of the conductive thread, a capacitance of the conductive thread, or combinations thereof;
the object produces a change in the electromagnetic field, a change in the inductance, a change in the capacitance, or combinations thereof; and
the change in the electrical phenomena includes the change in the electromagnetic field, the change in the inductance, the change in the capacitance, or combinations thereof.

11. An autonomous ride-sharing vehicle including:
a surface upon which an object of personal property can be arranged;
a conductive thread;
a power source electrically connected to the conductive thread and providing electric current flowing through the conductive thread;
a sensor detecting electrical phenomena resulting from the electric current flowing through the conductive thread; and
an indicator in communication with the sensor;
wherein the conductive thread is arranged relative to the surface such that when the object is on the surface, the object produces a change in the electrical phenomena; and
wherein the indicator generates an alert indicating to an occupant, who is an owner of the object, that the object is on the surface if both of the following a) and b) are satisfied:
a) the change in the electrical phenomena is occurring, and
b) the occupant is leaving the vehicle.

12. The vehicle according to claim 11, wherein
the conductive thread is arranged in a material layer covering a component of the vehicle; and
the component includes a seat, a floor, a roof, a trunk, or combinations thereof.

13. The vehicle according to claim 12, wherein the conductive thread is arranged under the surface.

14. The vehicle according to claim 11, wherein:
the indicator includes a electroluminescent light source arranged under the surface;
the electroluminescent light source is selectively operable to emit light; and
the alert includes light emitted from the electroluminescent light source.

15. The vehicle according to claim 14, wherein the electroluminescent light source includes electroluminescent yarn interwoven with the conductive thread.

16. The vehicle according to claim 11, wherein:
the indicator includes a transmitter;
the transmitter is selectively operable to send a wireless signal to a receiver associated with the occupant; and
the alert includes the wireless signal.

17. The vehicle according to claim 16, wherein the signal indicates to the owner that the object has been left on the surface.

18. The vehicle according to claim 11, wherein:
the electrical phenomena includes a voltage of the electric current flowing through the conductive thread;
the conductive thread includes a piezoresistive material that experiences an increase in resistance when mechanically stressed by a weight of the object on the surface; and
the change in the electrical phenomena includes a decrease in the voltage resulting from the increase in resistance.

19. The vehicle according to claim 11, wherein:
the electrical phenomena includes an electromagnetic field produced by the electric current flowing through the conductive thread, an inductance of the conductive thread, a capacitance of the conductive thread, or combinations thereof;
the object produces a change in the electromagnetic field, a change in the inductance, a change in the capacitance, or combinations thereof; and
the change in the electrical phenomena includes the change in the electromagnetic field, the change in the inductance, the change in the capacitance, or combinations thereof.

20. The vehicle according to claim 11, further including an electronic control unit in communication with the sensor, the power source, and the indicator,
wherein the electronic control unit controls the indicator to produce the alert according to the change in the electrical phenomena.

* * * * *